(No Model.)
C. H. ANSPACH.
THILL COUPLING AND SUPPORT.
No. 544,205. Patented Aug. 6, 1895.
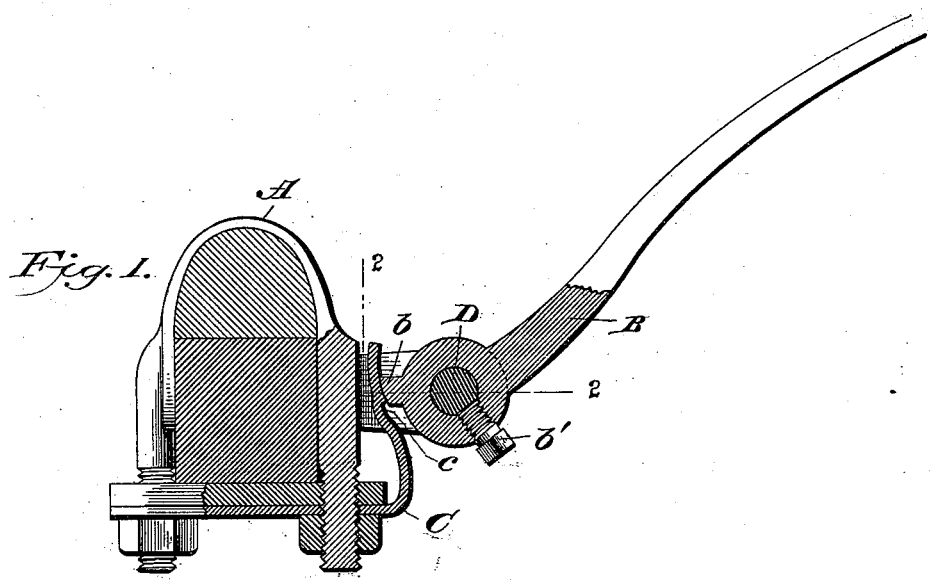
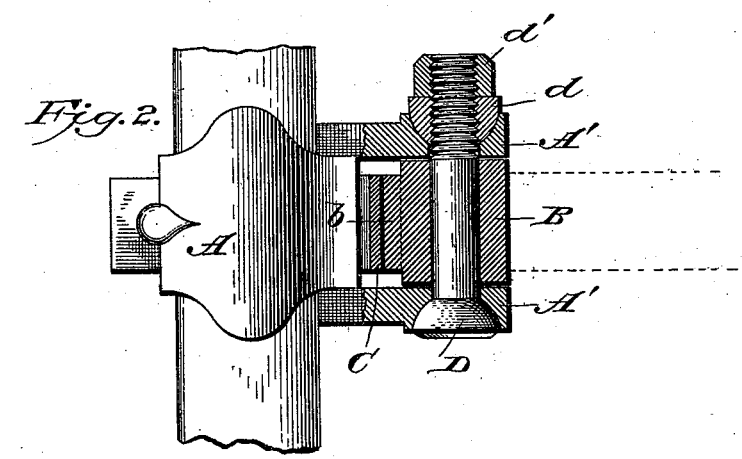
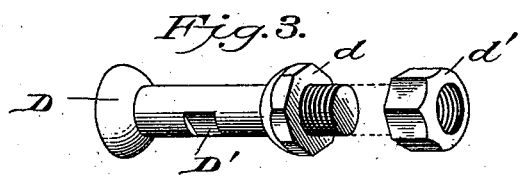
WITNESSES
Charles H. Anspach
INVENTOR
Attorney

UNITED STATES PATENT OFFICE.

CHARLES H. ANSPACH, OF CEDAR GROVE, INDIANA.

THILL COUPLING AND SUPPORT.

SPECIFICATION forming part of Letters Patent No. 544,205, dated August 6, 1895.

Application filed February 7, 1895. Serial No. 537,650. (No model.)

*To all whom it may concern:*

Be it known that I, CHARLES H. ANSPACH, a citizen of the United States of America, residing at Cedar Grove, in the county of Franklin and State of Indiana, have invented certain new and useful Improvements in Thill Couplings and Supports; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an improved means for connecting the thill-iron to the axle-clip, as well as means for holding the thills elevated; and it consists in the construction and combination of the parts, as will be hereinafter fully set forth, and particularly pointed out in the claim.

In the accompanying drawings, forming part of this specification, Figure 1 is a side view, partly in section, showing a thill coupling and support constructed in accordance with my invention. Fig. 2 is a plan view partly in section, and Fig. 3 is a detail view of the coupling-bolt.

A designates the axle-clip, which is provided with the usual lugs or ears A', said lugs or ears having semi-spherical bearing-surfaces formed in their outer sides surrounding the apertures for the connecting-bolt.

The eye of the thill-iron is provided with a threaded aperture which intersects the main aperture and is adapted to receive a locking-screw $b'$ for the purpose hereinafter set forth. The eye is also provided with a transverse projecting portion $b$ on the side thereof opposite the shank of the thill-iron proper.

The clip is attached to the axle in the usual manner, and has secured thereto a spring C, which at a suitable point is provided with a recess $c$ formed therein, the upper part of the recess presenting a shoulder. With this recess $c$ the transverse projecting portion $b$ of the thill-eye engages when the parts are connected and the thills elevated.

D designates the coupling-bolt, which is provided with a conical head, and the screw-threaded portion of this bolt is adapted to receive a bearing-block $d$, which is provided with a conical bearing-surface and is locked in position upon the bolt by a nut $d'$. The center portion of the bolt is provided with a recess D' presenting a flat bearing-surface for the end of the locking-screw $b'$, carried by the thill-iron, so as to hold the thill-iron in positive engagement with the bolt.

To assemble the parts the spring C is secured to the axle-clip, and, the thill-eye being placed between the ars of the clip, the bolt is passed through the ears and thill-eye. The bearing-block is then placed upon the bolt and the nut $d'$ turned upon the end of the bolt with sufficient force to securely couple the parts.

It will be noted that the locking-screw $b'$ is out of line with the projection $b$, so as not to interfere with any of the parts when the thills are raised and lowered. The projection $b$ has a curved or rounded-out end, so that the edge of the same will present a better holding-surface when in engagement with the notch in the spring. By providing the eye of the thill-iron with a projecting portion the point of contact is farther away from the center than if recesses in the eye were employed. The thills can be readily lowered by exerting a pressure thereon sufficient to bend the spring, so that the notch therein will disengage the projection $b$.

Having thus described my invention, what I claim as new, and desire to secure by Letters Patent, is—

In a thill coupling, the combination, of an axle-clip, a spring C attached to the clip and provided with an upwardly projecting portion which extends between the ears or lugs of the clip, said portion having below its upper end a transverse recess $c$ the upper part of which projects outwardly abruptly from the body portion of the spring, together with a thill-iron having a rearwardly-projecting portion $b$ curved to correspond with the curvature of the spring and provide an angle edge for engagement with the recess $c$ in the spring, the parts being organized as shown, whereby an anti-rattling device is provided as well as means for holding the thills in an elevated position.

In testimony whereof I affix my signature in presence of two witnesses.

CHARLES H. ANSPACH.

Witnesses:
CLINTON C. SWIFT,
CHARLES F. JONES.